US012451651B2

(12) United States Patent
Mizukami et al.

(10) Patent No.: US 12,451,651 B2
(45) Date of Patent: Oct. 21, 2025

(54) CONNECTOR

(71) Applicant: Tyco Electronics Japan G.K., Kawasaki (JP)

(72) Inventors: Kazuhiro Mizukami, Kawasaki (JP); Tadashi Kumamoto, Kawasaki (JP)

(73) Assignee: TE CONNECTIVITY JAPAN G.K., Kawasaki (JP)

( * ) Notice: Subject to any disclaimer, the term of this patent is extended or adjusted under 35 U.S.C. 154(b) by 332 days.

(21) Appl. No.: 18/340,378

(22) Filed: Jun. 23, 2023

(65) Prior Publication Data

US 2023/0335948 A1 Oct. 19, 2023

Related U.S. Application Data

(63) Continuation of application No. PCT/JP2021/046942, filed on Dec. 20, 2021.

(30) Foreign Application Priority Data

Dec. 23, 2020 (JP) ................................ 2020-213091

(51) Int. Cl.
*H01R 13/631* (2006.01)
*H01R 13/502* (2006.01)
(Continued)

(52) U.S. Cl.
CPC ....... *H01R 13/631* (2013.01); *H01R 13/5025* (2013.01); *H01R 13/508* (2013.01); *H01R 13/533* (2013.01)

(58) Field of Classification Search
CPC .............. H01R 13/631; H01R 13/5025; H01R 13/508; H01R 13/533; H01R 12/714;
(Continued)

(56) References Cited

U.S. PATENT DOCUMENTS 6,012,948 A * 1/2000 Wu ........................ H01R 12/00 439/567
6,059,581 A 5/2000 Wu
(Continued)

FOREIGN PATENT DOCUMENTS

EP 3605740 B1 * 3/2024 ........... H01R 13/648
JP 07011018 2/1995
(Continued)

OTHER PUBLICATIONS

Japanese Office Action dated May 28, 2024 with English translation, corresponding to Application No. 2020-213091, 7 pages.
(Continued)

*Primary Examiner* — Travis S Chambers

(57) ABSTRACT

A connector includes a back housing, a front shell having a barrel portion and a grounding portion continuous with a rear portion of the barrel portion, and a cover shell. The cover shell has a contacting portion contacting a rear end upper portion of the front shell, a catching portion catching on the grounding portion, and a spring portion elastically deformed by catching of the catching portion. The elastic deformation of the spring portion causes the cover shell to contact the back housing while pressing the back housing frontward, and to contact the front shell while pressing the rear end upper portion of the front shell upward at the contacting portion.

18 Claims, 12 Drawing Sheets

(51) Int. Cl.
*H01R 13/508* (2006.01)
*H01R 13/533* (2006.01)

(58) Field of Classification Search
CPC .. H01R 13/6595; H01R 12/724; H01R 43/16; H01R 24/50; H01R 12/71; H01R 13/658
See application file for complete search history.

(56) References Cited

U.S. PATENT DOCUMENTS

| | | | | |
|---|---|---|---|---|
| 6,165,015 | A | 12/2000 | Wu et al. | |
| 2009/0042450 | A1 | 2/2009 | Zheng et al. | |
| 2009/0253298 | A1* | 10/2009 | Kameyama | H01R 12/724 439/607.41 |
| 2010/0035465 | A1 | 2/2010 | Wang | |
| 2011/0013872 | A1 | 1/2011 | Zhang et al. | |
| 2011/0256773 | A1* | 10/2011 | Hsu | H01R 12/724 439/626 |
| 2013/0178101 | A1 | 7/2013 | Tao et al. | |

FOREIGN PATENT DOCUMENTS

| | | | | |
|---|---|---|---|---|
| JP | 2016018589 A | | 2/2016 | |
| JP | 6542921 B2 | * | 7/2019 | H01R 9/0524 |
| JP | 2019149238 A | | 9/2019 | |

OTHER PUBLICATIONS

European Patent Office Search Report dated Oct. 22, 2024, corresponding to Application No. 21910681.2-1201/4270668 PCT/JP2021046842, 9 pages.

International Search Report and Written Opinion from Japanese Patent Office dated Jan. 18, 2022, corresponding to Application No. PCT/JP2021/046942 with English translation, 5 pages.

* cited by examiner

CONNECTOR

CROSS-REFERENCE TO RELATED APPLICATIONS

This application is a continuation of PCT International Application No. PCT/JP2021/046942, filed on Dec. 20, 2021, which claims priority under 35 U.S.C. § 119 to Japanese Patent Application No. 2020-213091, filed on Dec. 23, 2020.

FIELD OF THE INVENTION

The present invention relates to a connector suitable for transmission of a high frequency signal.

BACKGROUND

A high frequency signal is susceptible to electromagnetic noise, and, in order to reduce the influence of electromagnetic noise, a connector having a structure covered with a shield is adopted. That is, a connector is employed that has a structure where a contact for directly transmitting a high frequency signal is supported by a housing, and the contact and the housing are enclosed with a shield. For example, Japanese Patent Application No. 2016-018589A discloses a connector having a structure where a contact is supported by a housing referred to as an insulator, which in turn is enclosed with shields referred to as an outer peripheral shell and a back shell.

Each of the components constituting the connector has a tolerance, namely a dimensional tolerance. Therefore, this dimensional tolerance may cause the transmission characteristics of the connector completed by assembling such components together to vary among the connectors. If this variation is great, the connector must be handled as having low transmission characteristics according to the great variation, and thus the variation hinders configuring a connector having high-performance transmission characteristics. In order to reduce the dimensional tolerance, each component has to be manufactured with high precision, but pursuing this causes the components to be costly, and is therefore limited.

SUMMARY

A connector includes a back housing, a front shell having a barrel portion and a grounding portion continuous with a rear portion of the barrel portion, and a cover shell. The cover shell has a contacting portion contacting a rear end upper portion of the front shell, a catching portion catching on the grounding portion, and a spring portion elastically deformed by catching of the catching portion. The elastic deformation of the spring portion causes the cover shell to contact the back housing while pressing the back housing frontward, and to contact the front shell while pressing the rear end upper portion of the front shell upward at the contacting portion.

BRIEF DESCRIPTION OF THE DRAWINGS

The invention will now be described by way of example with reference to the accompanying Figures, of which.

DETAILED DESCRIPTION OF THE EMBODIMENT(S)

Embodiments of the present invention will be described in detail below.

Figure 1A:
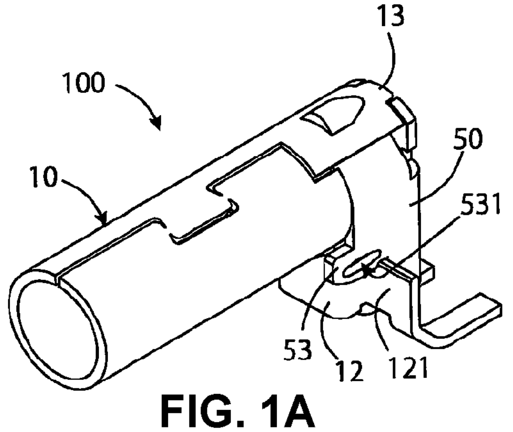
FIG. 1A is a perspective view of a connector according to an embodiment.
Figure 1B:
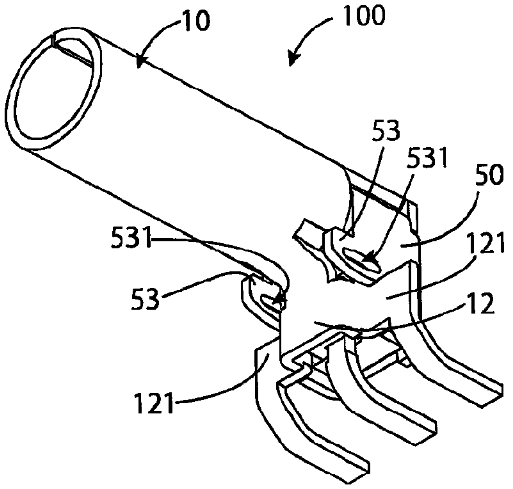
FIG. 1B is another perspective view of the connector.
Figure 2A:
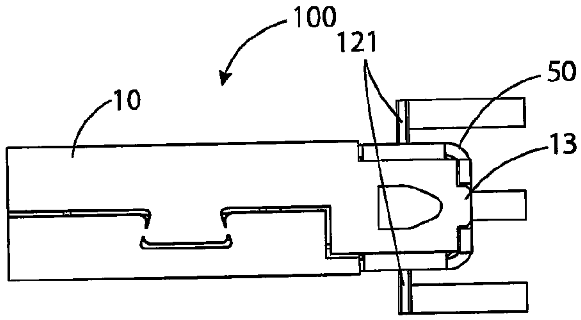
FIG. 2A is a top view of the connector.
Figure 2B:
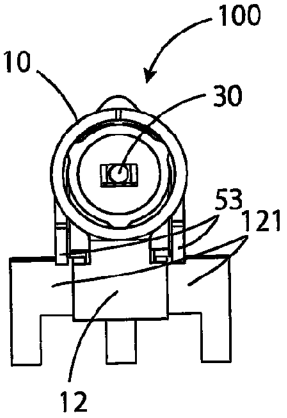
FIG. 2B is a front end view of the connector.
Figure 2C:
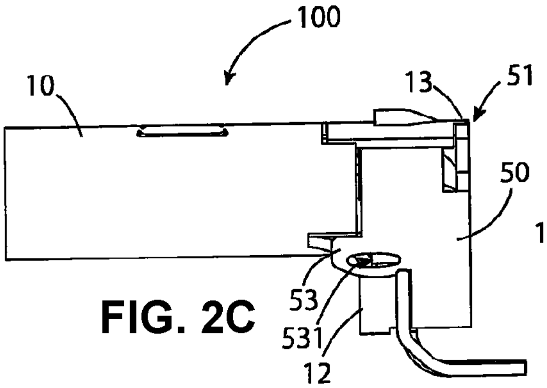
FIG. 2C is a side view of the connector.
Figure 2D:
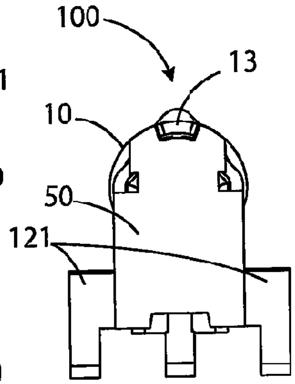
FIG. 2D is a rear end view of the connector.
Figure 2E:
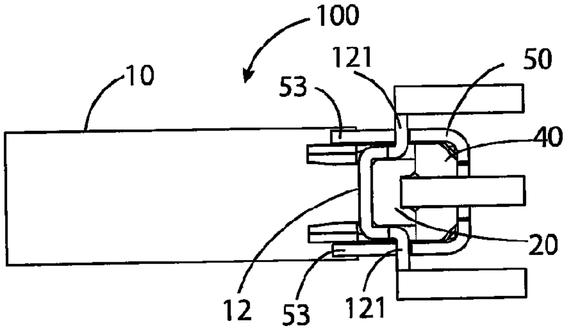
FIG. 2E is a bottom view of the connector.
Figure 3:
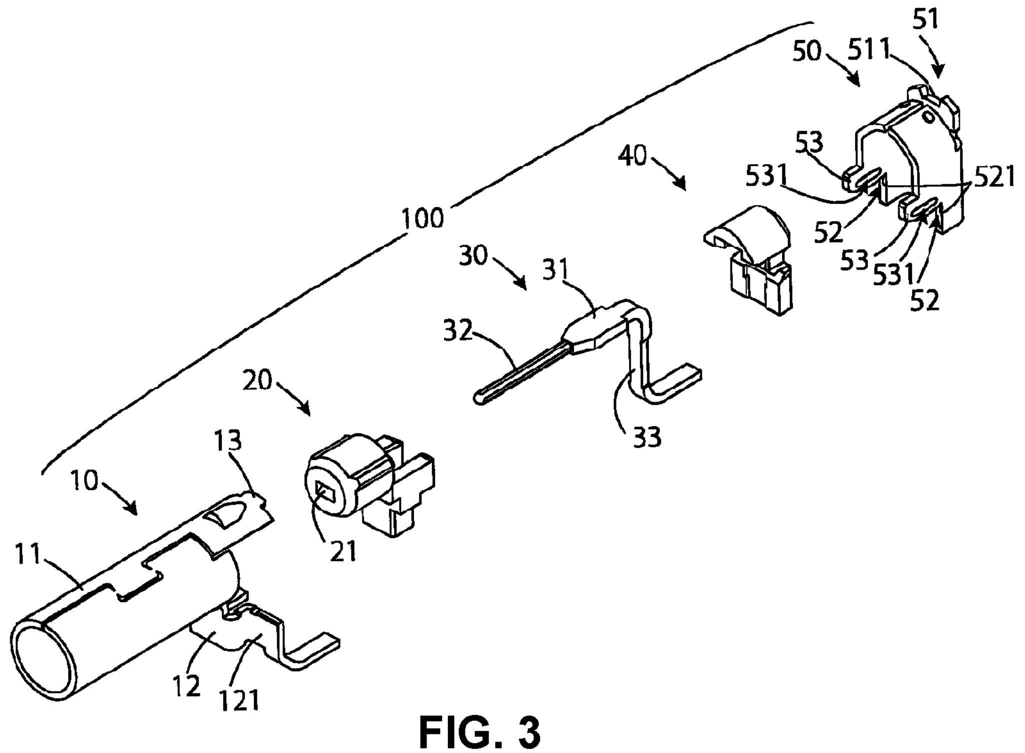
FIG. 3 is an exploded perspective view of the connector.

A connector 100 according to an embodiment, as shown in FIG. 3, is composed of a front shell 10, a front housing 20, a contact 30, a back housing 40, and a cover shell 50.

The contact 30 is a component made of a conductor, for example, a copper alloy. The conductor constituting this contact 30 is equivalent to an example of a first conductor as referred to in the present invention. This contact 30 has a base portion 31, a contact portion 32, and a board connecting portion 33.

The contact portion 32 extends from the base portion 31 in a frontward direction in which the connector 100 mates with a mating connector, and makes electrical contact with a mating contact provided in the mating connector. The contact portion 32 of the contact 30 of the present embodiment is a rod-like horizontally extending male contact portion.

As shown in FIG. 3, the board connecting portion 33 extends from the base portion 31 in a downward direction in which a circuit board is positioned, and makes connection to the circuit board. Here, the board connecting portion 33 of the contact 30 of the present embodiment is of a surface mounting type that is soldered to the surface of the circuit board. That is, this board connecting portion 33 extends downward, and thereafter bends rearward and extends horizontally. This horizontally extending portion is placed on the surface of the circuit board and soldered thereto.

In an embodiment, the front housing 20 is composed of a resin that is an example of a first dielectric as referred to in the present invention. A longitudinal through-hole 21 is formed in the front housing 20 of the present embodiment, as shown in FIG. 3. The front housing 20 supports the base portion 31 with the contact portion 32 of the contact 30 inserted through the hole 21 and exposed frontward.

In an embodiment, the back housing 40 is composed of a resin that is an example of a second dielectric as referred to in the present invention. This back housing 40 supports the base portion 31 such that the base portion 31 is held between the back housing 40 and the front housing 20, with the board connecting portion 33 exposed downward.

In an embodiment, the front shell 10 is composed of a sheet material made of a conductor such as a copper alloy, and is stamped and formed. A conductor such as a copper alloy constituting this front shell 10 is equivalent to an example of a second conductor as referred to in the present invention. This front shell 10 has a barrel portion 11 and a grounding portion 12.

The barrel portion 11 has a longitudinally extending substantially cylindrical shape. The contact portion 32 of the contact 30 is inserted into this barrel portion 11, and the barrel portion 11 encloses the contact portion 32 inserted thereinto at a distance from the contact portion 32.

The grounding portion 12 is continuous with a rear portion of the barrel portion 11 and widens downward. This grounding portion 12 makes connection to the circuit board. This grounding portion 12, like the board connecting portion 33 of the contact, also bends rearward halfway and extends horizontally. This horizontally extending portion is placed on the surface of the circuit board and soldered thereto. The grounding portion 12 of the present embodiment has such a shape as to be soldered at two right and left locations.

The cover shell 50, like the front shell 10, is also composed of a sheet material made of a conductor such as a copper alloy, and is stamped and formed into such a shape as to cover the back housing 40. The conductor, such as a copper alloy, constituting this cover shell 50 is equivalent to an example of a third conductor as referred to in the present invention. This cover shell 50 is formed with a contacting portion 51, a catching portion 52, and a spring portion 53.

The contacting portion 51 contacts a rear end upper portion of the front shell 10 from below. Here, the rear end upper portion of the front shell 10 is provided with a rearward projecting tongue 13. On the other hand, the contacting portion 51 is provided with a recess 511 for receiving the tongue 13. The action of elastic deformation of the spring portion 53, which will be described later, causes this cover shell 50 to press the tongue 13 received in the recess 511 upward, thereby ensuring reliable contact between the front shell 10 and the cover shell 50.

In addition, the catching portion 52 catches on the grounding portion 12 of the front shell 11. Specifically, the grounding portion 12 is provided with an extending portion 121 extending laterally. In addition, the catching portion 52 has a depression 521 (see FIG. 3 and FIG. 4A) depressed upward. This depression 521 of the catching portion 52 catches on the extending portion 121 such that it rests astride the extending portion 121. The grounding portion 12 is provided with a pair of extending portions 121 extending rightward and leftward, respectively. Correspondingly, a pair of right and left catching portions 52 are formed, and the cover shell 50 catches on the front shell 10 at the two right and left catching portions 52. These catching portions 52 catch on the extending portions 121, thereby contacting the front shell 10 reliably. That is, the cover shell 50 contacts the front shell 10 at three locations in total: the contact portion 51 formed at the top; and the pair of right and left catching portions 52 at the bottom, and is kept at the same potential as the front shell 10 to serve as a shield.

When this connector 100 is assembled and the cover shell 50 catches on the extending portion 121, the spring portion 53 elastically deforms. The elastic deformation of this spring portion 53, on the one hand, as described above, causes the cover shell 50 to press the tongue 13 received in the recess 511 upward, thereby ensuring reliable contact between the front shell 10 and the cover shell 50. In addition, on the other hand, the elastic deformation of the spring portion 53 causes the cover shell 50 to contact the back housing 40 while pressing the back housing 40 frontward. This prevents formation of a gap between the back housing 40 and the cover housing 50 regardless of a dimensional tolerance of a component such as the back housing 40 or the cover shell 50, thereby reducing variations in the transmission characteristics among the connectors 100.

In addition, the spring portion 53 has a shape projecting more frontward than the catching portion 52. This spring portion 53 is also so formed as to be a pair of right and left spring portions. In the present embodiment, a hole 531 is formed in the spring portion 53. Therefore, when the catching portion 52 catches on the extending portion 121, the spring portion 53 undergoes elastic deformation accompanied by deformation of the hole 531.

Figure 4A:
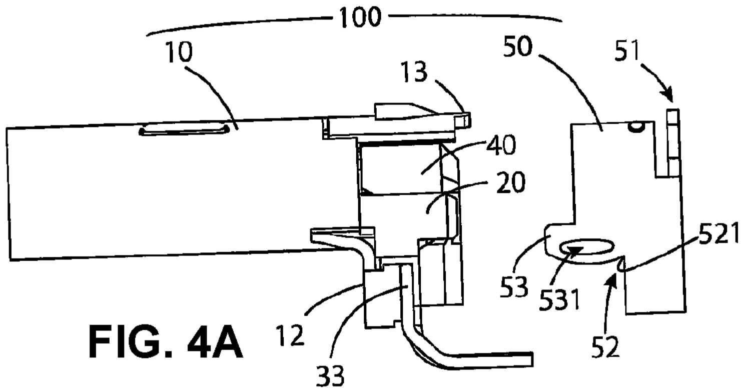
FIG. 4A is a side view of the connector in a state before a cover shell is assembled.
Figure 4B:
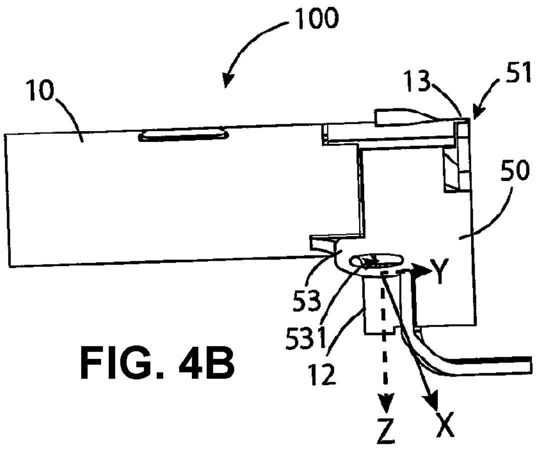
FIG. 4B is a side view of the connector in a state with the cover shell assembled.
Figure 4C:
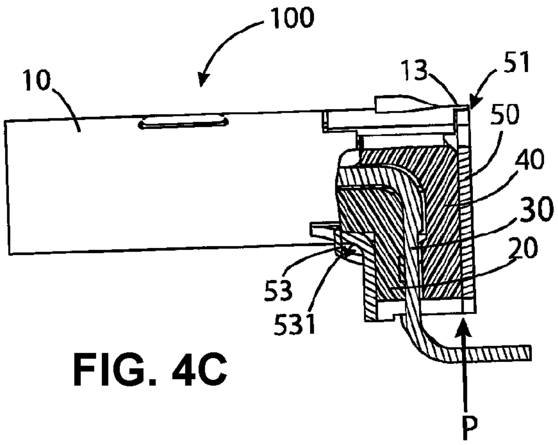
FIG. 4C is a partially sectional side view of the connector in an assembled state.

When this connector 100 is assembled, as shown in FIG. 4A, the cover shell 50 is a component to be assembled last. When this cover shell 50 is assembled, the tongue 13 of the front shell 10 is received in the recess 511 of the contacting portion 51, and the catching portion 53 is caught on the extending portion 121. This causes elastic deformation of the spring portion 53, and a force in the direction of a vector X shown in FIG. 4B is applied from the catching portion 52 of the cover shell 50 to the extending portion 212 of the front shell 10. This vector X is decomposed into a horizontal component Y and a vertical component Z. The vertical component Z causes the tongue 13 of the front shell 10 to be pressed upward by the contacting portion 51, thereby ensuring electrical contact between the tongue 13 and the contacting portion 51, and simultaneously ensures that the catching portion 52 catches on the extending portion 121, thereby also ensuring electrical connection between the catching portion 52 and the extending portion 121. In addition, a reaction force of the horizontal component Y causes the back housing 40 to be pressed from behind by the cover shell 50, thereby preventing creation of a gap between the back housing 40 and the cover shell 50, as indicated by an arrow P in FIG. 4C, regardless of a dimensional tolerance of a component.

Figure 5:
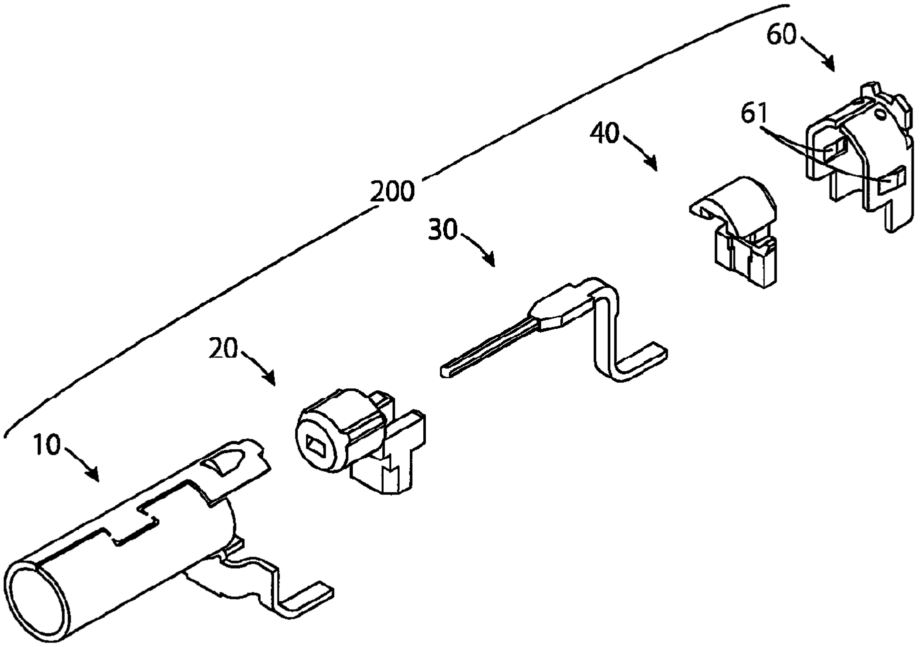
FIG. 5 is an exploded perspective view of a connector according to an embodiment.

A connector 200 according to another embodiment, also referred to as a comparative example, is shown in FIG. 5.

The connector 200 of the comparative example shown in FIG. 5 is composed of a front shell 10, a front housing 20, a contact 30, a back housing 40, and a cover shell 60. All of these components except for the cover shell 60 are the same as the corresponding components of the connector 100 of the present embodiment shown in FIG. 3. On the other hand, the cover shell 60 is different from the cover shell 50 shown in FIG. 3 in that it lacks the spring portion 53. In addition, this cover shell 60 of the comparative example has a structure where lanced tabs 61 are formed on right and left walls to hold the back housing 40 elastically therebetween from the right and left sides.

Regarding the connector 100 of the present embodiment and the connector 200 as the comparative example shown in FIG. 5, variations in transmission characteristics due to a dimensional tolerance of a component will be discussed below.

Figure 6A:
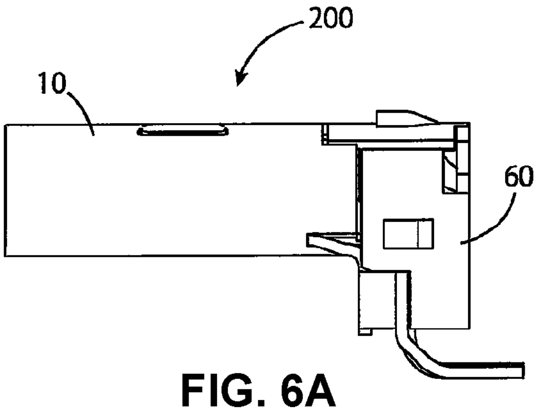
FIG. 6A is a side view of the connector of FIG. 5.
Figure 6B:
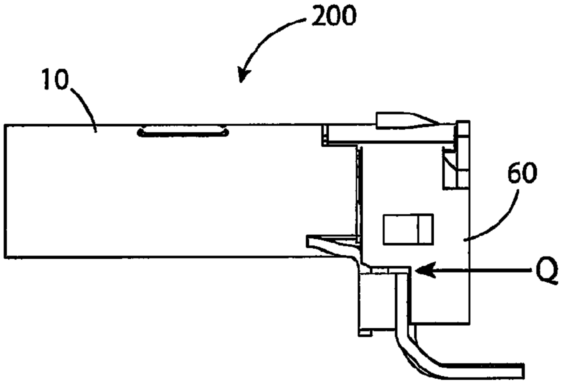
FIG. 6B is another side view of the connector of FIG. 5.

FIGS. 6A and 6B are side views of the connector 200. Here, FIG. 6A shows the connector 200 with the cover shell 60 in contact with both the tongue 13 and the extending portion 121 of the front shell 10. In addition, in the case of the connector 200 shown in FIG. 6B, because the cover shell 60 is shorter in vertical dimension, or the like, a gap has occurred between the cover shell 60 and the extending portion 121, as indicated by an arrow Q.

Figure 7:
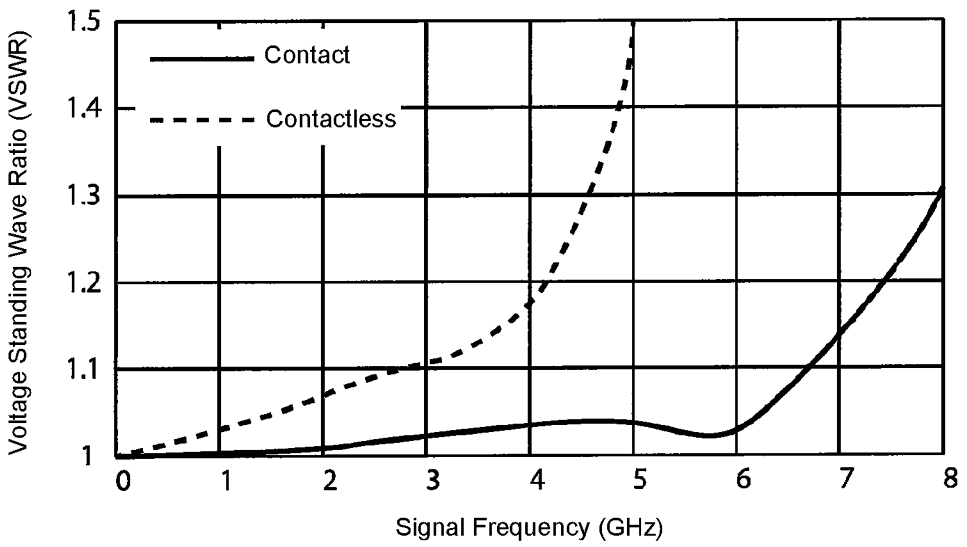
FIG. 7 is a graph of a voltage standing wave ratio of the connector.

FIG. 7 is a diagram showing voltage standing wave ratio of the connector 200. In FIG. 7, the horizontal axis represents signal frequency (GHz), and the vertical axis represents voltage standing wave ratio (VSWR). In addition, the “contact” graph shown in the solid line is a graph when the cover shell 60 is in contact with both the tongue 13 and the extending portion 121 of the front shell 10, as shown in FIG. 6A. On the other hand, the “contactless” graph shown in the dashed line is a graph when the cover shell 60 is in contact with the tongue 13 of the front shell 10 but a gap lies between the cover shell 60 and the extending portion 121, as shown in FIG. 6B. The voltage standing wave ratio (VSWR) keeps its lower values until higher frequencies in the solid line graph.

Figure 8:
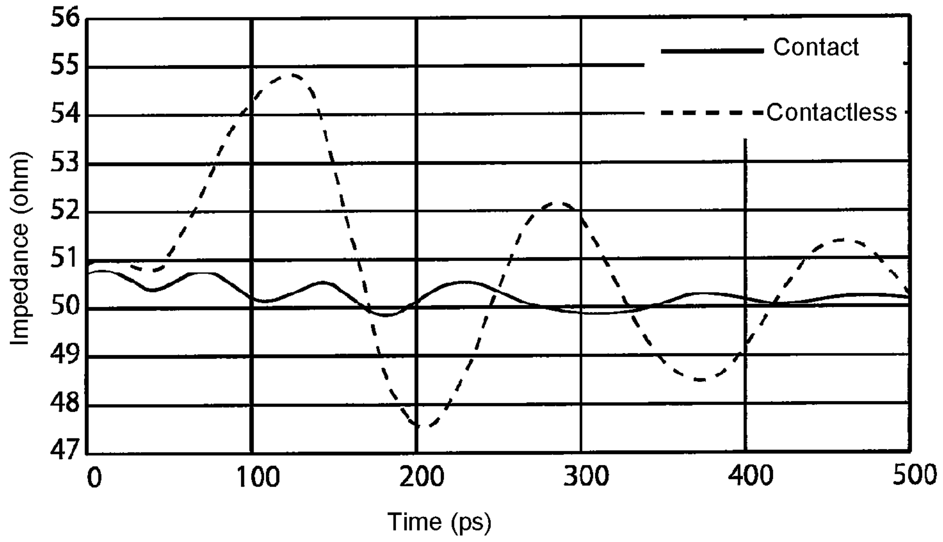
FIG. 8 is a graph of an impedance of the connector.

FIG. 8 is a diagram showing impedance in the connector 200. In FIG. 8, the horizontal axis represents time (ps), and the vertical axis represents impedance (ohm). The respective meanings of the solid line and the dashed line are the same as in FIG. 7. It can be seen that the impedance (ohm) is more stable at around 50 ohm in the solid line graph. In the case of the connector 100 of the present embodiment, regardless of variations among components, the cover shell 50 is always kept in contact with both the tongue 13 and the extending portion 121 of the front shell 10.

Figure 9A:
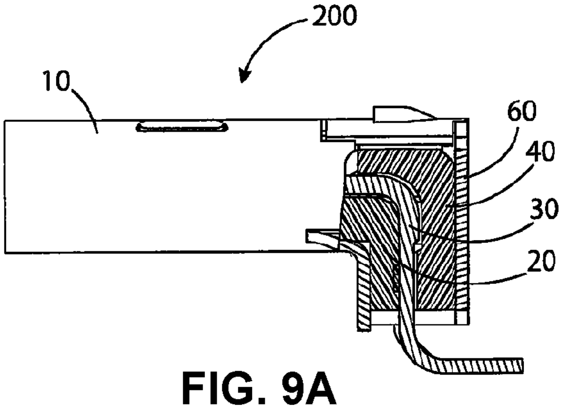
FIG. 9A is a partially sectional side view of the connector of FIG. 5.
Figure 9B:
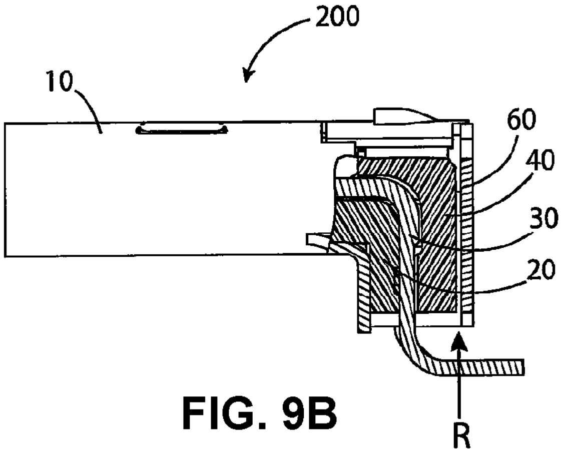
FIG. 9B is another partially sectional side view of the connector of FIG. 5.

FIGS. 9A and 9B are partially cross-sectional side views of the connector 200. Here, in FIG. 9A, the cover shell 60 is in contact with the back housing 40. On the other hand, in the case of FIG. 9B, because the cover shell 60 is longer in longitudinal dimension, or the like, a gap has occurred between the cover shell 60 and the back housing 40, as indicated by an arrow R.

Figure 10:
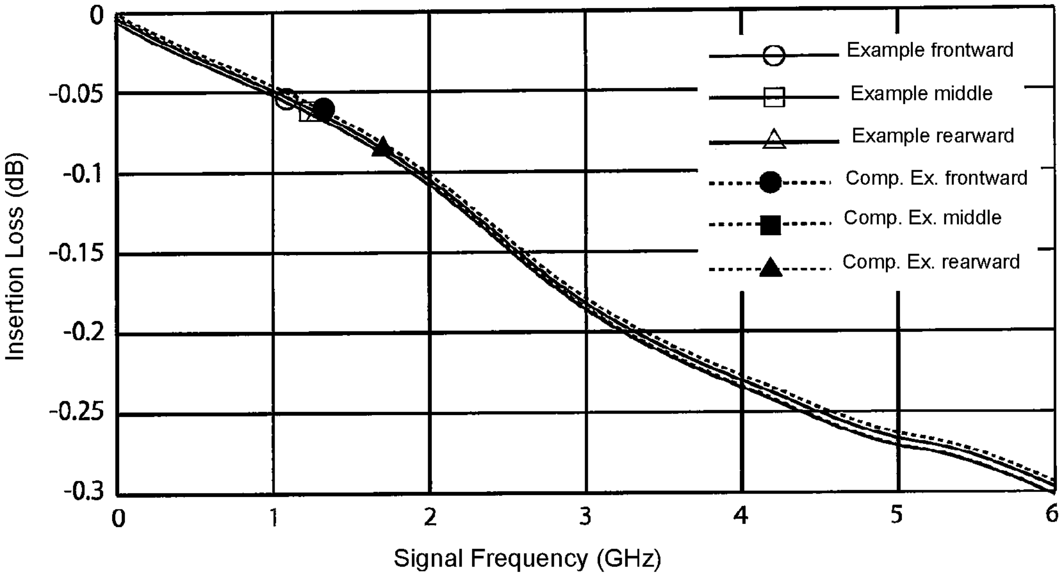
FIG. 10 is a graph showing insertion loss of the connectors according to the embodiments.

FIG. 10 is a diagram showing insertion loss in “Example” and “Comparative Example”. In FIG. 10, the horizontal axis represents signal frequency (GHz), and the vertical axis represents insertion loss (dB). The “Example” refers to a connector 100 having the structure shown in FIG. 3, and the “Comparative Example” refers to a connector 200 having the structure shown in FIG. 5. In addition, “frontward”, “middle”, and “rearward” mean longitudinal positions of a rear face of the cover shell 50 (or the cover shell 60) after assembly. In the case of the “Comparative Example”, when the cover shell 60 is more rearward, it means that a gap has occurred between the cover shell 60 and the back housing 40, as shown in FIG. 9B. The insertion loss (dB) is almost the same between the “Example” and the “Comparative Example”, and also between the “frontward”, the “middle”, and the “rearward”.

Figure 11:
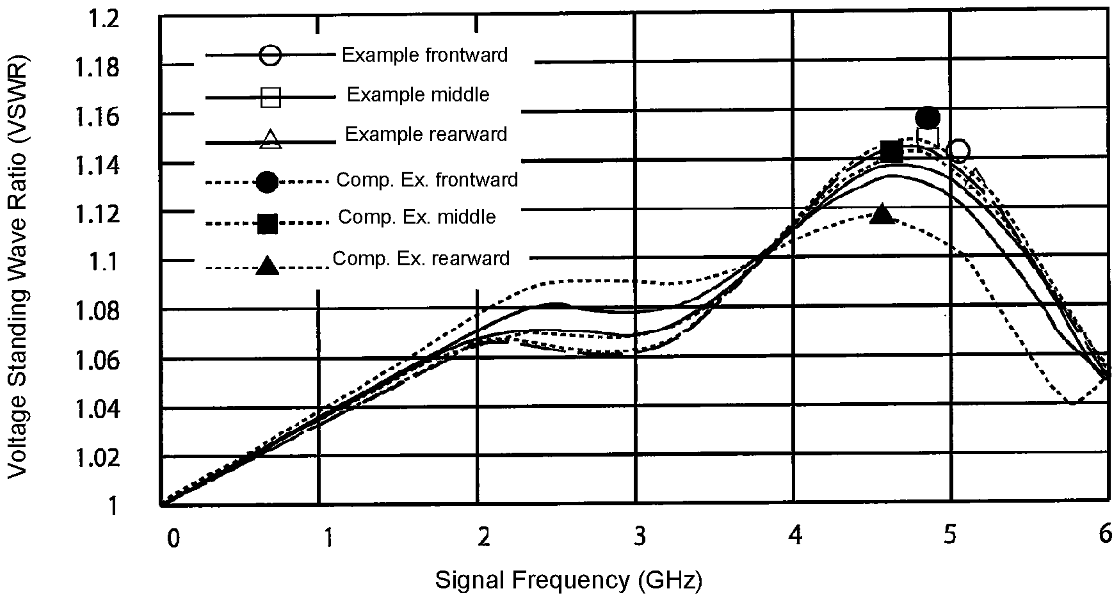
FIG. 11 is a graph showing voltage standing wave ratio of the connectors.

FIG. 11 is a diagram showing voltage standing wave ratio (VSWR) of “Example” and “Comparative Example”. In FIG. 11, the horizontal axis represents signal frequency (GHz), and the vertical axis represents voltage standing wave ratio (VSWR). The respective meanings of “Example” and “Comparative Example” and of “frontward”, “middle”, and “rearward” are the same as in FIG. 10. The “frontward”, the “middle”, and the “rearward” draw curves more approximate to each other in the “Example” shown in the solid line than in the “Comparative Example” shown in the dashed line in FIG. 11.

Figure 12:
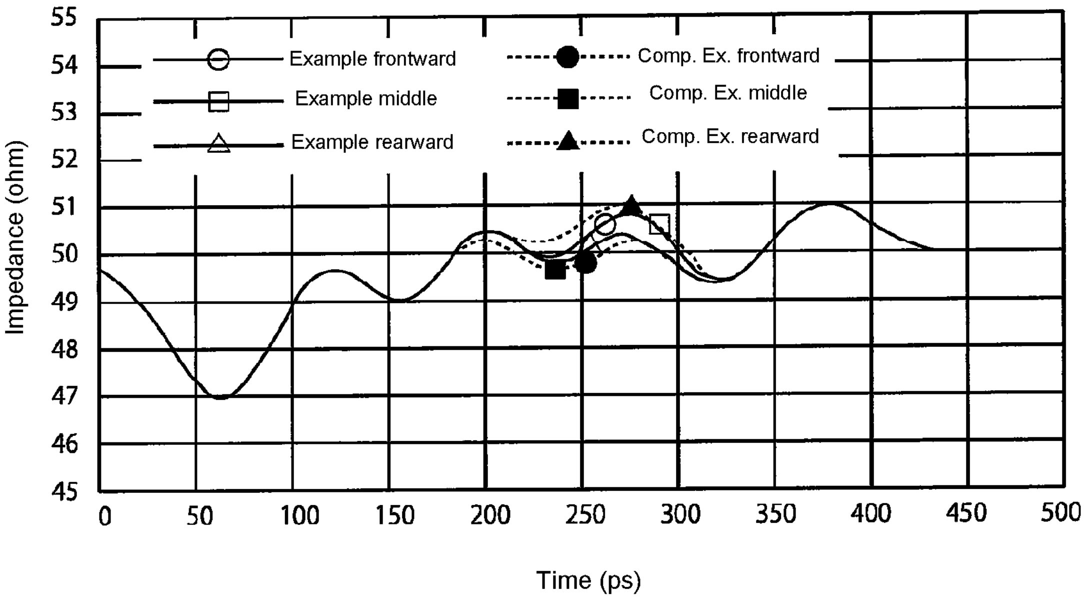
FIG. 12 is a graph showing impedance of the connectors.

FIG. 12 is a diagram showing impedance (ohm) of “Example” and “Comparative Example”. In FIG. 12, the horizontal axis represents time (ps), and the vertical axis represents impedance (ohm). The respective meanings of “Example” and “Comparative Example” and of “frontward”, “middle”, and “rearward” are the same as in FIGS. 10 and 11. As in the case of FIG. 11, the “frontward”, “middle”, and “rearward” draw curves more approximate to each other in the “Example” shown in the solid line than the “Comparative Example” shown in the dashed line.

As can be seen in FIGS. 10 to 12, if there is the same dimensional tolerance, the connector 100 of the present embodiment can obtain more stable transmission characteristics than the connector 200.

It should be noted that, though a connector provided with a male contact has been described here, the present invention is also applicable as it is to a connector provided with a female contact.

It should also be noted that, though a surface mounting type connector has been described here, the present invention is also applicable to a connector of a type that is inserted into a through-hole of a circuit board and soldered thereto.

What is claimed is:

1. A connector, comprising:

a contact composed of a first conductor and having a base portion, a contact portion extending from the base portion in a frontward direction in which the connector mates with a mating connector, for making contact with a mating contact, and a board connecting portion extending from the base portion in a downward direction in which a circuit board is positioned, and connected to the circuit board;

a front housing composed of a first dielectric and supporting the base portion with the contact portion exposed frontward;

a back housing composed of a second dielectric and supporting the base portion with the base portion held between the front housing and the back housing with the board connecting portion exposed downward;

a front shell composed of a second conductor and having a barrel portion enclosing the contact portion at a distance from the contact portion, and a grounding portion continuous with a rear portion of the barrel portion, widening downward, and connected to the circuit board; and a cover shell composed of a third conductor, having a contacting portion contacting a rear end upper portion of the front shell from below, a catching portion catching on the grounding portion, and a spring portion elastically deformed by catching of the catching portion, the elastic deformation of the spring portion causing the cover shell to contact the back housing while pressing the back housing frontward, and to contact the front shell while pressing the rear end upper portion of the front shell upward at the contacting portion.

2. The connector of claim 1, wherein the front shell has a tongue projecting rearward at the rear end upper portion of the front shell.

3. The connector of claim 2, wherein the contacting portion has a recess receiving the tongue.

4. The connector of claim 3, wherein the elastic deformation of the spring portion causes the cover shell to press the tongue received in the recess upward.

5. The connector of claim 1, wherein the grounding portion has an extending portion extending laterally.

6. The connector of claim 5, wherein the catching portion catches on the extending portion, causing the spring portion to deform elastically.

7. The connector of claim 6, wherein the catching portion has a depression depressed upward.

8. The connector of claim 7, wherein the catching portion catches on the extending portion at the depression.

9. The connector of claim 1, wherein the spring portion has a shape projecting more frontward than the catching portion.

10. The connector of claim 9, wherein the spring portion has a hole.

11. The connector of claim 10, wherein catching of the catching portion causes the elastic deformation accompanied by deformation of the hole.

12. A connector, comprising:

a back housing formed of an insulative material;

a front shell having a barrel portion and a grounding portion continuous with a rear portion of the barrel portion; and a cover shell having a contacting portion contacting a rear end upper portion of the front shell, a catching portion catching on the grounding portion, and a spring portion elastically deformed by catching of the catching portion, the elastic deformation of the spring portion causing the cover shell to contact the back housing while pressing the back housing frontward, and to contact the front shell while pressing the rear end upper portion of the front shell upward at the contacting portion.

13. The connector of claim 12, wherein the front shell and the cover shell are each formed of a conductive material.

14. The connector of claim 12, further comprising a contact having a base portion, a contact portion extending from the base portion, and a board connecting portion extending from the base portion.

15. The connector of claim 14, wherein the barrel portion encloses the contact portion of the contact at a distance from the contact portion.

16. The connector of claim 14, further comprising a front housing supporting the base portion with the contact portion exposed frontward.

17. The connector of claim 14, wherein the back housing supports the base portion.

18. The connector of claim 17, wherein the base portion is held between the front housing and the back housing with the board connecting portion exposed downward.

* * * * *